United States Patent
Park

(10) Patent No.: US 10,482,573 B2
(45) Date of Patent: *Nov. 19, 2019

(54) METHOD AND MOBILE DEVICE FOR DISPLAYING IMAGE

(71) Applicant: Samsung Electronics Co., Ltd., Suwon-si, Gyeonggi-do (KR)

(72) Inventor: Taegun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

This patent is subject to a terminal disclaimer.

(21) Appl. No.: 15/720,643

(22) Filed: Sep. 29, 2017

(65) Prior Publication Data

US 2018/0025469 A1  Jan. 25, 2018

Related U.S. Application Data

(63) Continuation of application No. 14/141,002, filed on Dec. 26, 2013, now Pat. No. 9,779,475.

(30) Foreign Application Priority Data

Jan. 7, 2013  (KR) .................. 10-2013-0001691

(51) Int. Cl.
*G06T 3/20* (2006.01)
*G09G 5/14* (2006.01)
(Continued)

(52) U.S. Cl.
CPC .............. *G06T 3/20* (2013.01); *G06F 3/0481* (2013.01); *G06F 3/04886* (2013.01); *G09G 5/14* (2013.01);
(Continued)

(58) Field of Classification Search
None
See application file for complete search history.

(56) References Cited

U.S. PATENT DOCUMENTS

| 7,956,869 B1 | 6/2011 | Gilra |
| 8,217,904 B2 | 7/2012 | Kim |

(Continued)

FOREIGN PATENT DOCUMENTS

| CN | 1893590 A | 1/2007 |
| CN | 1912920 A | 2/2007 |

(Continued)

OTHER PUBLICATIONS

CMM, [android App] LINE, You Tube, Oct. 17, 2011, search date: Oct. 2, 2017, internet, <URL: https://www.youtube.com/watch?v=iyZojwgOF1E>, Oct. 17, 2011.

(Continued)

*Primary Examiner* — Tize Ma
(74) *Attorney, Agent, or Firm* — Jefferson IP Law, LLP

(57) ABSTRACT

A method and a mobile device to display a specific image at the highest layer of a screen are provided. The mobile device displays moving images at a first region of a screen and, if an event to perform a function in a second region of the screen is received, determines a second region for displaying a specific image associated with the event. The mobile device determines whether the second region is overlapped with the first region. If the second region is overlapped with the first region, the mobile device determines a third region not overlapped with the second region. Thereafter, the mobile device displays the specific image at the second region and displays the moving images at the third region.

28 Claims, 14 Drawing Sheets

(51) Int. Cl.
*G06F 3/0481* (2013.01)
*G06F 3/0488* (2013.01)
(52) U.S. Cl.
CPC ............. *G06F 2203/04803* (2013.01); *G09G 2340/045* (2013.01); *G09G 2340/0464* (2013.01); *G09G 2340/12* (2013.01); *G09G 2340/145* (2013.01)

(56) References Cited

U.S. PATENT DOCUMENTS

| | | | |
|---|---|---|---|
| 9,779,475 B2 * | 10/2017 | Park | G06F 3/0481 |
| 2003/0076340 A1 | 4/2003 | Hatori et al. | |
| 2006/0026535 A1 | 2/2006 | Hotelling et al. | |
| 2007/0008338 A1 | 1/2007 | Kim | |
| 2007/0035776 A1 | 2/2007 | Asai | |
| 2008/0198141 A1 | 8/2008 | Lee et al. | |
| 2008/0301577 A1 | 12/2008 | Onda et al. | |
| 2009/0031243 A1 | 1/2009 | Kano et al. | |
| 2009/0228820 A1 | 9/2009 | Kim et al. | |
| 2010/0088634 A1 | 4/2010 | Tsuruta et al. | |
| 2010/0105362 A1 | 4/2010 | Yang | |
| 2010/0182248 A1 | 7/2010 | Chun | |
| 2010/0248788 A1 | 9/2010 | Yook et al. | |
| 2010/0277414 A1 | 11/2010 | Tartz et al. | |
| 2010/0295789 A1 | 11/2010 | Shin et al. | |
| 2011/0107212 A1 | 5/2011 | Jeong | |
| 2011/0271222 A1 | 11/2011 | Cho | |
| 2012/0023453 A1 | 1/2012 | Wagner | |
| 2012/0113007 A1 | 5/2012 | Koch et al. | |
| 2012/0290966 A1 | 11/2012 | Chae et al. | |
| 2013/0332881 A1 | 12/2013 | Yook et al. | |
| 2016/0034178 A1 | 2/2016 | Yoon | |

FOREIGN PATENT DOCUMENTS

| | | |
|---|---|---|
| CN | 102365617 A | 2/2012 |
| EP | 1959338 A3 | 7/2009 |
| JP | 2003-219308 A | 7/2003 |
| JP | 2004-260632 A | 9/2004 |
| JP | 2008-040622 A | 2/2008 |
| JP | 2009-109223 A | 5/2009 |
| JP | 2010-134625 A | 6/2010 |
| KR | 10-0754579 B1 | 12/2007 |
| KR | 10-2008-0076390 A | 8/2008 |
| KR | 10-2009-0077603 A | 7/2009 |
| KR | 10-2009-0096149 A | 9/2009 |
| KR | 10-2010-0107377 A | 10/2010 |
| KR | 10-2010-0124427 A | 11/2010 |
| KR | 10-1482121 B1 | 1/2015 |
| WO | 2010/110613 A1 | 9/2010 |
| WO | 2012/061572 A2 | 5/2012 |

OTHER PUBLICATIONS

New functions for transmitting videos and audio messages!, LINE official blog, LINE, search date: Oct. 2, 2017, Internet, <URL: http://official-blog.line.me/ja/archives/6203860.html>, Apr. 26, 2012.
Korean Office Action with English translation dated Jan. 9, 2019; Korean Appln. No. 10-2013-0001691.
European Search Report dated Apr. 17, 2019, issued in European Patent Application No. 18207373.4.
Japanese Office Action dated Jul. 1, 2019, issued in Japanese Patent Application No. 2018-127439.

* cited by examiner

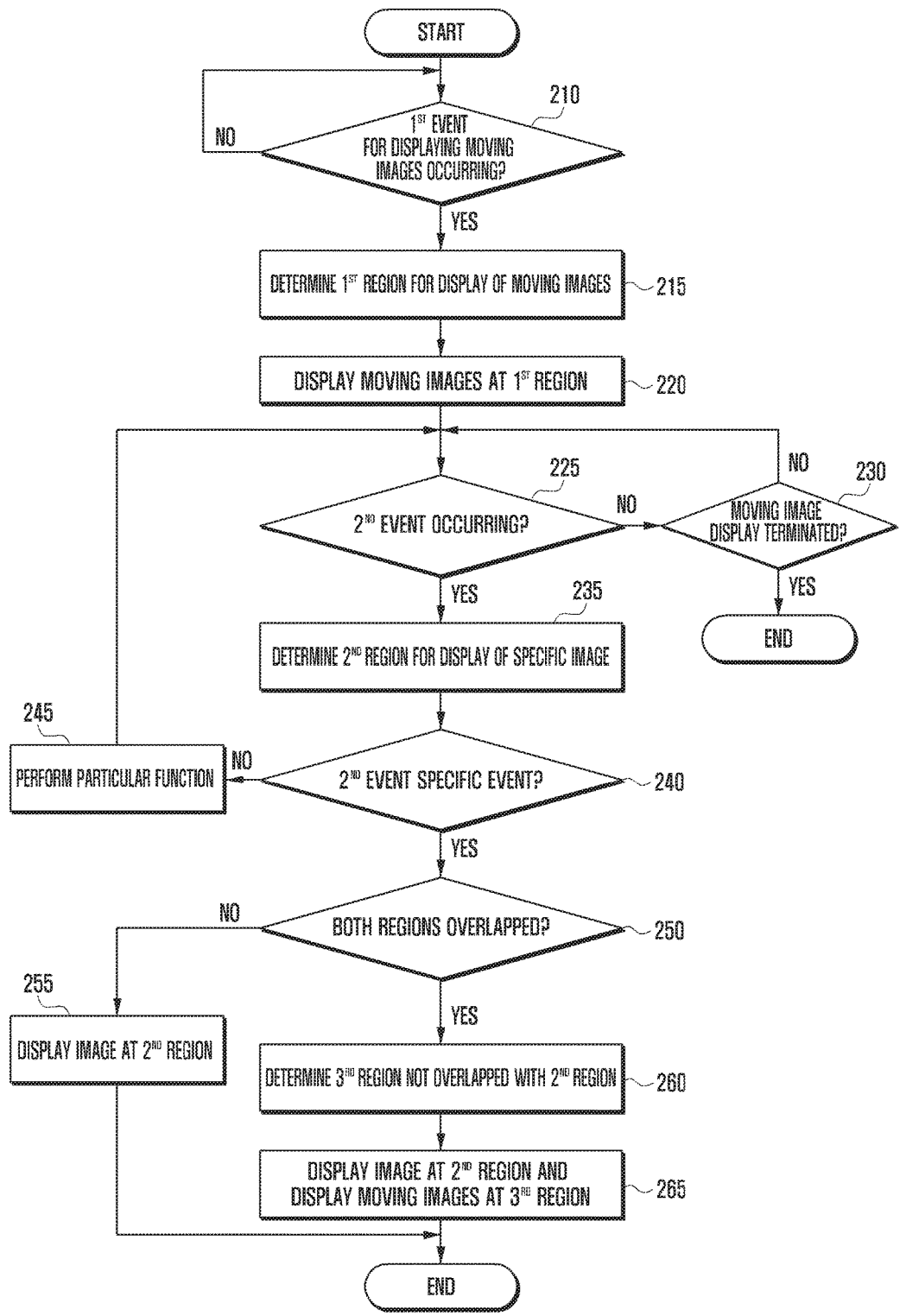

FIG. 3A
FIG. 3B
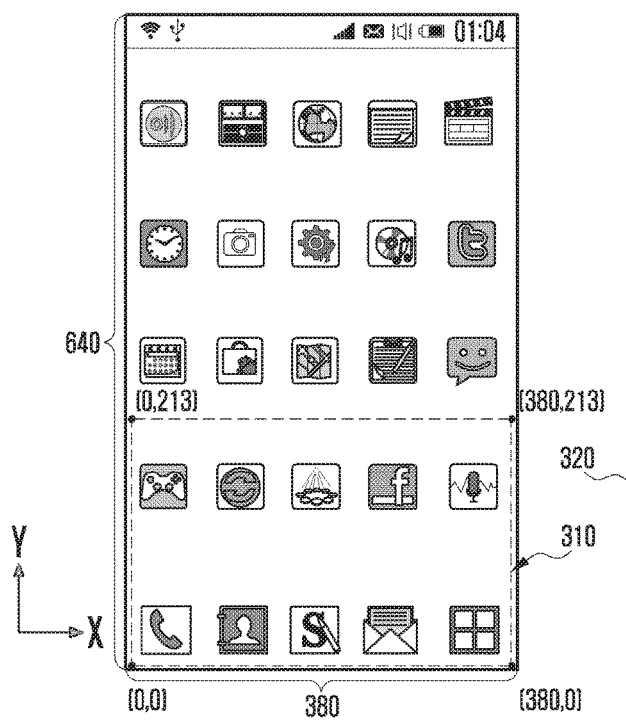
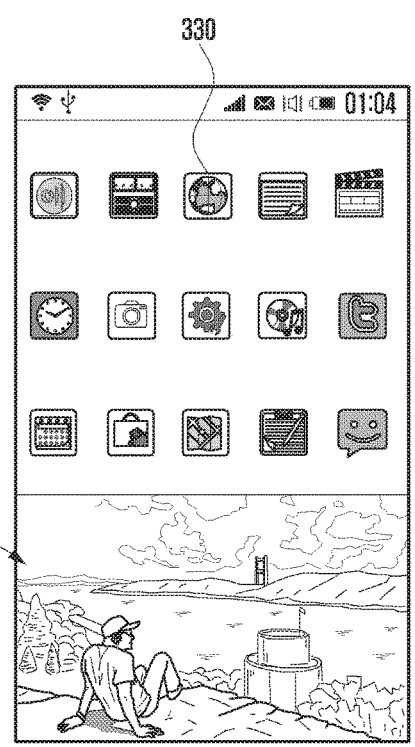

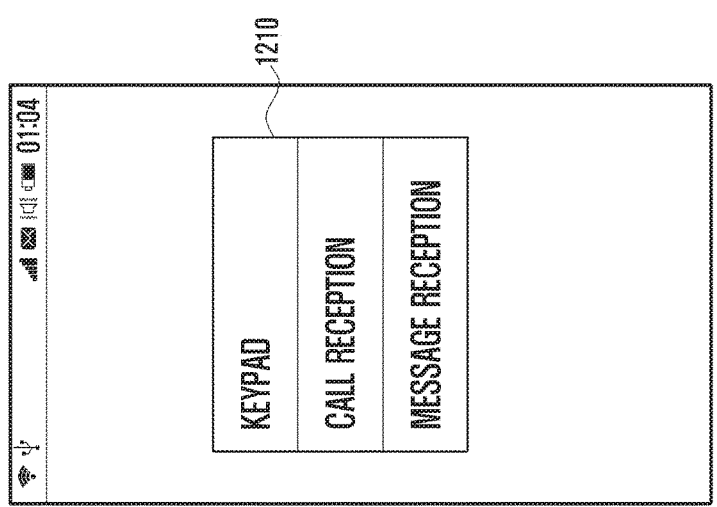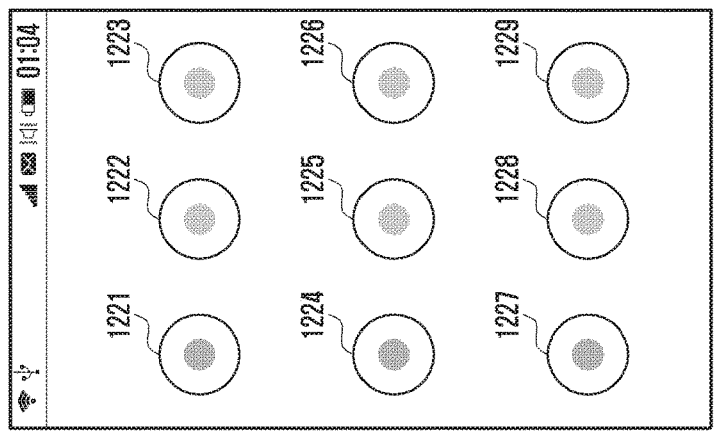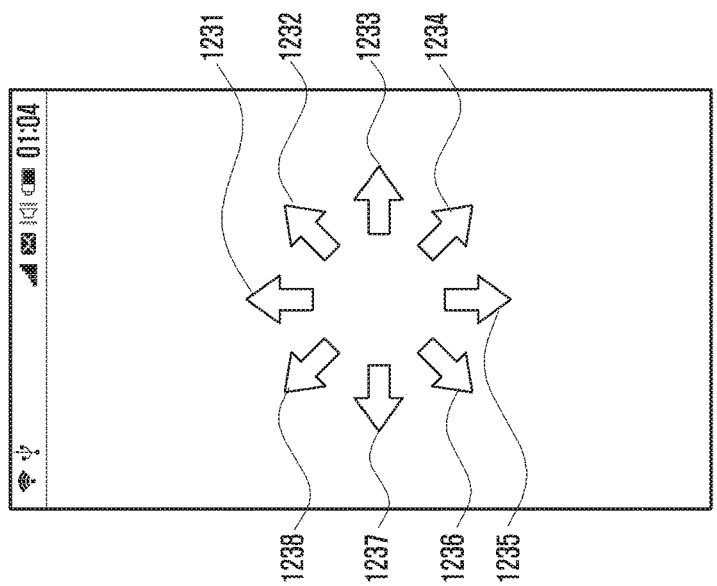

METHOD AND MOBILE DEVICE FOR DISPLAYING IMAGE

CROSS-REFERENCE TO RELATED APPLICATION(S)

This application is a continuation application of prior application Ser. No. 14/141,002, filed on Dec. 26, 2013, which has issued as U.S. Pat. No. 9,779,475 on Oct. 3, 2017 and claimed the benefit under 35 U.S.C. § 119(a) of a Korean patent application filed on Jan. 7, 2013 in the Korean Intellectual Property Office and assigned Serial No. 10-2013-0001691, the entire disclosure each of which are hereby incorporated by reference.

TECHNICAL FIELD

The present disclosure relates to an image display technology of a mobile device. More particularly, the present disclosure relates to a method and a mobile device for displaying a specific image at the highest layer of a screen.

BACKGROUND

With improvements in hardware performance and advances in multimedia technology, mobile devices are now able to provide a function to display moving images at the highest layer of a screen. Namely, moving images are located at the topmost layer in comparison with all other images. This function is often called a popup function. With the popup function, a user can carry out another task, such as web surfing or a Short Message Service (SMS) transmission, while watching moving images on the screen.

However, since a display location of moving images is fixed on the screen, a popup function of the related art may often disturb a user's task. For example, when moving images are being displayed at a horizontally lower region on the screen, when an event (i.e., an input command to perform a function) for requesting a display of a keypad occurs, the mobile device displays a keypad in response to this event. In this case, the keypad is normally displayed at a lower region on the screen, thus overlapping the moving images. Accordingly, a user is forced to change a display location of the moving images so as to use a keypad while watching the moving images.

Therefore, a need exists for a method and a mobile device for displaying a specific image at the highest layer of a screen, which enables a user to carry out a task while watching moving images.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a mobile device for displaying a specific image at the highest layer of a screen, which enables a user to carry out a task while watching moving images.

In accordance with an aspect of the present disclosure, a method for displaying an image in a mobile device is provided. The method includes displaying moving images at a first region of a screen, if an event to perform a function in a second region of the screen is received, determining the second region for displaying a specific image associated with the event, determining whether the second region is overlapped with the first region, if the second region is overlapped with the first region, determining a third region not overlapped with the second region, and displaying the specific image at the second region and simultaneously displaying the moving images at the third region.

In accordance with another aspect of the present disclosure, a method for displaying an image in a mobile device is provided. The method includes displaying moving images at a first region of a screen, if an event to perform a function in a second region of the screen is received, determining the second region for displaying a specific image associated with the event, determining whether the second region is overlapped with the first region, if the second region is overlapped with the first region, determining a third region not overlapped with the first region, and displaying the specific image at the third region.

In accordance with another aspect of the present disclosure, a method for displaying an image in a mobile device is provided. The method includes displaying moving images at a first region of a screen, if an event to perform a function in a second region of the screen is received, determining the second region for displaying a specific image associated with the first event, determining whether the second region is overlapped with the first region, if the second region is overlapped with the first region, displaying the specific image at the second region and displaying semi-transparently a part of the moving images overlapped with the specific image, and if a second event for a change in a location of the moving images is received, displaying the moving images at a third region not overlapped with the second region.

In accordance with another aspect of the present disclosure, a method for displaying an image in a mobile device is provided. The method includes displaying moving images at a first region of a screen, if an event to perform a function in a second region of the screen is received, determining the second region for displaying a specific image associated with the event, determining whether the second region is overlapped with the first region, if the second region is overlapped with the first region, displaying guiding symbols for changes in a location of the moving images, detecting a selection of one of the guiding symbols, and displaying the specific image at the second region and simultaneously displaying the moving images at a third region corresponding to the selected guiding symbol.

In accordance with another aspect of the present disclosure, a method for displaying an image in a mobile device is provided. The method includes displaying a first image at a first region of a screen, if an event to perform a function in a second region of the screen is received, determining the second region for displaying a second image associated with the event, determining whether the second region is overlapped with the first region, if the second region is overlapped with the first region, determining a third region not overlapped with the second region, and displaying the second image at the second region and simultaneously displaying the first image at the third region.

In accordance with an aspect of the present disclosure, a mobile device is provided. The mobile device includes a display unit configured to display moving images at a first region of a screen, a receiving unit configured to receive an event to perform a function in a second region of the screen, and a control unit configured to receive the event from the receiving unit and to control a display of the moving images in response to the event, wherein the control unit is further configured to determine the second region for displaying a specific image associated with the event, to determine whether the second region is overlapped with the first region, to determine a third region not overlapped with the second region if the second region is overlapped with the first region, and to control the display unit to display the specific image at the second region and simultaneously display the moving images at the third region.

In accordance with another aspect of the present disclosure, a mobile device is provided. The mobile devices includes a display unit configured to display moving images at a first region of a screen, at least one of a touch panel, a key input unit, a microphone, and a wireless communication unit, each of which is configured to receive an event, and a control unit configured to receive the event from the at least one of the touch panel, the key input unit, the microphone, and the wireless communication unit, and to control a display of the moving images in response to the event, wherein the control unit is further configured to determine a second region for displaying a specific image associated with the event, to determine whether the second region is overlapped with the first region, to determine a third region not overlapped with the first region if the second region is overlapped with the first region, and to display the specific image at the third region.

In accordance with another aspect of the present disclosure, a mobile device is provided. The mobile device includes a display unit configured to display moving images at a first region of a screen, at least one of a touch panel, a key input unit, a microphone, and a wireless communication unit, each of which is configured to receive a first event and a second event, and a control unit configured to receive the event from the at least one of the touch panel, the key input unit, the microphone, and the wireless communication unit, and to control a display of the moving images in response to the first event and the second event, wherein the control unit is further configured to determine a second region for displaying a specific image associated with the first event, to determine whether the second region is overlapped with the first region, to control the display unit to display the specific image at the second region and to display semi-transparently a part of the moving images overlapped with the specific image if the second region is overlapped with the first region, and control the display unit to display the moving images at a third region not overlapped with the second region in response to the second event.

In accordance with another aspect of the present disclosure, a mobile device is provided. The mobile device includes a display unit configured to display moving images at a first region of a screen, at least one of a touch panel, a key input unit, a microphone, and a wireless communication unit, each of which is configured to receive an event, and a control unit configured to receive the event from the at least one of the touch panel, the key input unit, the microphone, and the wireless communication unit, and to control a display of the moving images in response to the event, wherein the control unit is further configured to determine a second region for displaying a specific image associated with the event, to determine whether the second region is overlapped with the first region, to control the display unit to display guiding symbols for changes in a location of the moving images if the second region is overlapped with the first region, to detect a selection of one of the guiding symbols, and to control the display unit to display the specific image at the second region and simultaneously display the moving images at a third region corresponding to the selected guiding symbol.

In accordance with another aspect of the present disclosure, a mobile device is provided. The mobile device includes a display unit configured to display a first image and a second image, at least one of a touch panel, a key input unit, a microphone, and a wireless communication unit, each of which is configured to receive an event, and a control unit configured to receive the event from the at least one of the touch panel, the key input unit, the microphone, and the wireless communication unit, and to control a display of at least one of the first image and the second image in response to the event, wherein the control unit is further configured to determine a first region of a screen for displaying the first image, to control the display unit to display the first image at the first region, to determine a second region for displaying the second image when the event is received, to determine whether the second region is overlapped with the first region, to determine a third region not overlapped with the second region if the second region is overlapped with the first region, and to control the display unit to display the second image at the second region and simultaneously display the first image at the third region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2 is a flowchart illustrating an image display method according to an embodiment of the present disclosure.

FIGS. 3A, 3B, 3C, 3D, 4A, and 4B are screenshots illustrating an image display method according to an embodiment of the present disclosure.

FIGS. 12A, 12B, and 12C are screenshots illustrating an image display method according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a signal" includes reference to one or more of such signals.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
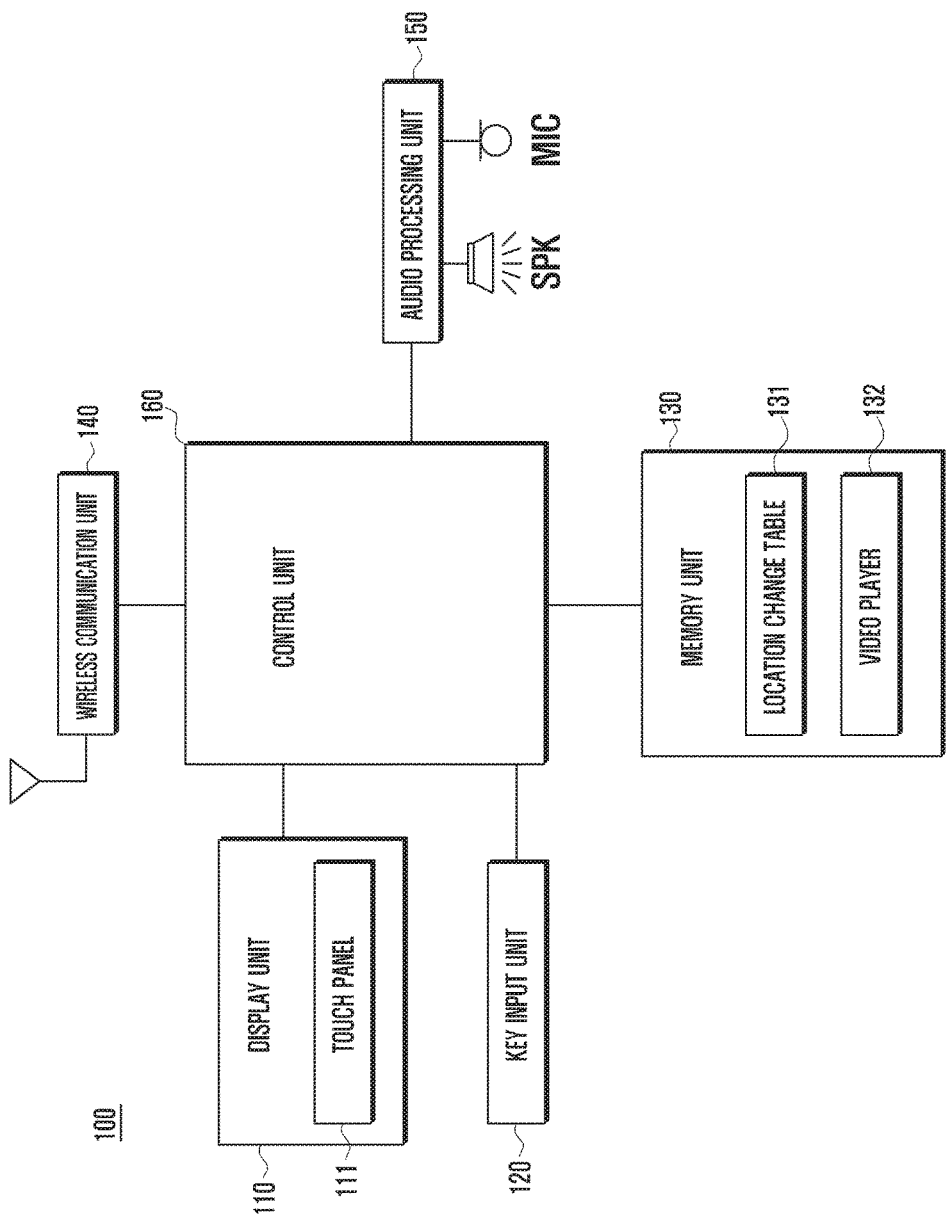
FIG. 1 is a block diagram illustrating a mobile device according to an embodiment of the present disclosure.

FIG. 1 is a block diagram illustrating a mobile device according to an embodiment of the present disclosure.

Referring to FIG. 1, a mobile device 100 may include a display unit 110, a key input unit 120, a memory unit 130, a wireless communication unit 140, an audio processing unit 150, a speaker SPK, a microphone MIC, and a control unit 160.

The display unit 110 may display at least one image on the screen under the control of the control unit 160. Namely, when the control unit 160 performs processing (e.g., decoding) of data to images to be displayed on the screen and stores such images in a buffer, the display unit 110 may convert the images stored in the buffer into analog signals and display them on the screen. More specifically, when electric power is supplied to the display unit 110, the display unit 110 may display a lock image. If an unlock event is detected, the control unit 160 may remove the displayed lock image and control the display unit 110 to display another image. Herein, an unlock event may include an alphanumeric input (i.e., a password, such as 1234) entered through the key input unit 120 or a virtual keypad displayed on the display unit 110, a touch gesture entered on the display unit 110, a voice input entered through the microphone MIC, and the like. Meanwhile, another image displayed instead of the lock image may be a home image, an application execution image (e.g., moving images, a webpage, and the like), a virtual keypad, any kind of list, or the like. The home image may contain a background image and a plurality of icons arranged on the background image. Each icon may indicate a specific application or specific data (e.g., a photo file, a video file, a voice recording file, a document, a message, and the like). If a user selects one of such icons by tapping for example, the control unit 160 may execute a specific application or data linked to the selected icon and control the display unit 110 to display an execution image.

The display unit 110 may display images in a multilayered structure under the control of the control unit 160. For example, the display unit 110 may display the first image (e.g., a home image, a webpage, and the like) on the screen and display the second image (e.g., moving images) on the first image. In this case, a region at which the first image is displayed may be the entire screen, and a region at which the second image is displayed may be a part of the screen. Therefore, a user can see only a part of the first image since the other part of the first image is hidden by the second image. Alternatively, the display unit 110 may display the second image transparently or semi-transparently such that the entire first image can be seen.

The display unit 110 may display moving images at the highest layer of the screen under the control of the control unit 160. For example, when a web browser is executed and thereby a webpage is displayed on the screen, the control unit 160 may control the display unit 110 to display moving images on a webpage. Alternatively, under the control of the control unit 160, the display unit 110 may display the first image (e.g., moving images) at the first region of the screen and display the second image (e.g., a virtual keypad, a message, a notification window, and the like) at the second region which is not overlapped with the first region.

The display unit 110 may be formed of a Liquid Crystal Display (LCD), an Organic Light Emitted Diode (OLED) or an Active Matrix OLED (AMOLED), a flexible display, or the like.

The display unit 110 may include a touch panel 111 placed thereon. More specifically, the touch panel 111 may be disposed on the screen of the display unit 110 (i.e., referred to as an add-on type) or inserted in the display unit 110 (i.e., referred to as an on-cell type or an in-cell type).

The touch panel 111 may create an analog signal (e.g., a touch event) in response to a user's gesture thereon, perform an analog-to-digital conversion, and transfer a digital signal to the control unit 160. Herein, a touch event may include touch coordinates (x, y). When touch coordinates are received from the touch panel 111, the control unit 160 may recognize that a touch occurs on the touch panel 111 by means of a touch tool (e.g., a finger or a pen). If touch coordinates are no longer received from the touch panel 111, the control unit 160 may recognize that a touch is released from the touch panel 111. If touch coordinates are changed, for example, from $(x_1, y_1)$ to $(x_2, y_2)$, the control unit 160 may recognize that a touch is moved on the touch panel 111. In response to a touch move, the control unit 160 may calculate a location variation (dx, dy) of a touch and a move a velocity of a touch. More particularly, based on touch coordinates, whether a touch is released, whether a touch is moved, a location variation of a touch, and a move velocity of a touch, the control unit 160 may recognize a user's gesture as one of a touch, a multi touch, a tap, a double tap, a long tap, a tap-and-touch, a drag, a flick, a press, a pinch-in, a pinch-out, and the like.

A touch refers to a gesture to make a touch tool be in contact with any point on the touch panel 111, and a multi touch refers to a gesture to make two or more touch tools (e.g., a thumb and a forefinger) be in simultaneous contact with two or more points. A tap refers to a gesture to touch any point on the touch panel and release (namely, a touchoff) a touch tool from the touch point without moving the touch tool, and a double tap refers to a gesture to tap twice the same point on the touch panel. A long tap refers to a gesture to touch relatively longer than a tap and release a touch tool from the touch point without moving the touch tool. A tap-and-touch refers to a gesture to tap any point on the touch panel and touch the same point within a given time (e.g., 0.5 second). A drag refers to a gesture to move a touch tool in an arbitrary direction while maintaining a touch on the touch panel. A flick refers to a gesture to move a touch tool more quickly than a drag and release the touch tool. A press refers to a gesture to touch and push any point on the touch panel. A pinch-in refers to a gesture to touch simultaneously two points on the touch panel and to narrow a distance between the touch points. A pinch-out refers to a gesture to touch simultaneously two points on the touch panel and to widen a distance between the touch points.

The touch panel 111 may be a complex touch panel that is composed of a finger touch panel for detecting a finger gesture and a pen touch panel for detecting a pen gesture. The finger touch panel may be formed of a capacitive type, a resistive type, an infrared type, or an ultrasonic type. The finger touch panel may create a touch event by a user's finger gesture or any other equivalent (e.g., an action of a conductive tool capable of causing a change in capacitance). Meanwhile, the pen touch panel may be formed of an electromagnetic induction type. Therefore, the pen touch panel may create a touch event by a stylus pen which is produced to form a magnetic field. In some embodiments of the present disclosure, the touch panel 111 may have a pressure sensor to detect the pressure of a touch point. Pressure information is transferred to the control unit 160, which may distinguish between a touch and a press based on such pressure information.

The key input unit 120 may have a plurality of keys for entering letters or numbers and setting various functions. These keys may include a menu invoking key, a screen on/off key, a power on/off key, a volume adjusting key, and the like. The key input unit 120 may create a key event in connection with a user's setting action or a function control of the mobile device 100 and transfer the key event to the control unit 160. Such a key event may include a power on/off event, a volume adjusting event, a screen on/off event, a shutter event, and the like. In response to the received key event, the control unit 160 may control various elements, as listed above, of the mobile device 100. Meanwhile, a key of the key input unit 120 may be referred to as a hard key, whereas a virtual key displayed on the display unit 110 or 120 may be referred to as a soft key.

The memory unit 130 may act as a secondary memory unit of the control unit 160 and include a disk, a Random Access Memory (RAM), a Read Only Memory (ROM), a flash memory, and the like.

The memory unit 130 may store a location change table 131 that may define mapping relations between event information and location information. Herein, location information may be modified by a user. Table 1 below shows an example of the location change table 131.

TABLE 1

| Event Information | Location Information |
|---|---|
| Keypad Display Request | Upper Region of Screen |
| Message Reception | Lower Region of Screen |
| Call Connection Request | Middle Region of Screen |

The memory unit 130 may store data (e.g., contacts) created in the mobile device 100 and also store data (e.g., messages or moving images) received from any external entities through the wireless communication unit 140.

The memory unit 130 may store information about the size of an image (e.g., a virtual keypad, moving images, a message, and the like) and information about an image display region. If the minimum unit of a screen is a pixel, size information may be represented as "x*y" wherein "x" denotes the x-th pixel on the X-axis and "y" denotes the y-th pixel on the Y-axis. Display region information may be represented as coordinates of four points, i.e., (x1, y1), (x1, y2), (x2, y1) and (x2, y2), or alternatively as coordinates of a single point.

The memory unit 130 may further store various setting values, such as a setting value, for indicating whether to automatically adjust the brightness of a screen, a setting value for indicating whether to use Bluetooth, a setting value for indicating whether to use a popup function, a setting value for indicating whether to use the location change table 131, and the like.

The memory unit 130 may store a booting program, an Operating System (OS), and a variety of applications. The OS not only may act as an interface between hardware and each application and between respective applications, but also may manage computer resources, such as a Central Processing Unit (CPU), a Graphical Processing Unit (GPU), a main memory unit, a secondary memory unit, and the like. In addition, the OS may control the operation of hardware and the execution of applications, define the order of tasks, control the arithmetic operation of CPU and GPU, and manage the storage of data and files. Applications may be classified into embedded applications and third party applications. For example, embedded applications may include a web browser, an email program, an instant messenger, and the like. Third party applications may be received from any web market server and installed in the mobile device 100. When electric power is supplied from a battery to the control unit 160 in the mobile device 100, a booting program may be loaded on a main memory unit (e.g., a RAM) of the control unit 160. The booting program may load the OS on the main memory unit, and the OS may load a selected application, e.g., a moving image player 132 which is also referred to as a video player, on the main memory unit.

Meanwhile, the memory unit 130 may further store a Speech-To-Text (STT) program that is designed for converting speech data to text. Additionally, the memory unit 130 may store an artificial intelligence program that analyzes voice command data to interpret a user's intention. More specifically, the artificial intelligence program may include a natural language processing engine for recognizing context from voice command data, an inference engine for inferring a user's intention based on the recognized context, an interaction engine for interacting with a user based on the recognized context, and the like.

The wireless communication unit 140 may perform a voice call, a video call, or a data communication with any external entity through a network under the control of the control unit 160. The wireless communication unit 140 may include a Radio Frequency (RF) transmitter that up-converts the frequency of an outgoing signal and amplifies the signal, and an RF receiver that amplifies with low-noise an incoming signal and down-converts the frequency of the signal. In addition, the wireless communication unit 140 may include a mobile communication module (e.g., a 3-generation mobile communication module, a 3.5-generation mobile communication module, a 4-generation mobile communication module, and the like), a digital broadcast module (e.g., a Digital Multimedia Broadcasting (DMB) module), and/or a short-range communication module (e.g., a Wi-Fi module, a Bluetooth module, or a Near Field Communication (NFC) module).

The audio processing unit 150 may perform the input and output of audio signals (e.g., voice command data) through the speaker SPK and the microphone MIC in connection with speech recognition, voice recording, digital recording, and a call. More specifically, the audio processing unit 150 may receive audio signals from the control unit 160, convert the received audio signals into analog signals through a digital-to-analog conversion, and output them to the speaker SPK. Further, the audio processing unit 150 may receive audio signals from the microphone MIC, convert the received audio signals into digital signals through an analog-to-digital conversion, and transfer them to the control unit 160. The speaker SPK may convert audio signals received from the audio processing unit 150 into sound waves and output them. The microphone MIC may convert sound waves collected from people or another sound source into audio signals.

The control unit 160 may control the whole operation of the mobile device 100, control signal flows between internal components of the mobile device 100, perform data processing, and control the supply of power from a battery to the respective components. Additionally, the control unit 160 may include a CPU and a GPU. The CPU is a key control unit of a computer system that performs calculation and comparison of data and interpretation and execution of commands. The GPU is a graphic control unit that performs, in place of the CPU, calculation and comparison of graphic-related data and interpretation and execution of related commands. Each of the CPU and GPU may be formed of a single package into which two or more independent cores (e.g., a quad-core) are integrated. Alternatively, the CPU and GPU may be integrated into a single chip (i.e., a System on Chip (SoC)). Alternatively, the CPU and GPU may be packaged in the form of a multi-layer. A structure having the CPU and GPU may be referred to as an Application Processor (AP).

The control unit 160 may include a main memory unit, for example, a RAM. The main memory unit may store various programs, such as a booting program, an operating system, applications which are loaded from the memory unit 130, and the like. The CPU and GPU may access such programs, interpret commands of such programs, and perform particular functions (e.g., a popup function) based on the result of interpretation. In addition, the control unit 160 may further include a cache memory that temporarily stores data to be written in the memory unit 130 and data read from the memory unit 180.

The control unit 160 may operate the mobile device 100 by using the above-discussed size information and display region information both of which are stored in the memory unit 130. For example, if an event for requesting a display of a virtual keypad occurs, the control unit 160 may read both size information and display region information, corresponding to a virtual keypad, from the memory unit 130 and, based on the read information, control the display unit 110 to display a virtual keypad at a display region.

Additionally, the control unit 160 may operate the mobile device 100 by using the above-discussed setting values stored in the memory unit 130. For example, when moving images are displayed, the control unit 160 may read from the memory unit 130 a setting value for indicating whether to use a popup function, and thereby determine whether to use a popup function. If it is determined that a popup function will be used, the control unit 160 may read from the memory unit 130 a setting value for indicating whether to use the location change table 131, and thereby determine whether to use the location change table 131. Alternatively, whether to use a popup function may be determined regardless of a corresponding setting value. For example, the display unit 110 may display a popup function button together with moving images. This button may be displayed semi-transparently on moving images or displayed at a separate region. When a user selects this button, the control unit 160 may trigger a popup function. At this time, a feedback indication, such as "ON", may be offered on the button. If a user selects the button again, the control unit 160 may terminate the popup function. At this time, a feedback indication, such as "OFF", may be offered on the button. Images to be used in connection with the popup function may be not limited to moving images. Additionally, another kind of images, such as photos, still images, memos, maps, or the like, may be displayed at the highest layer of a screen.

If it is determined that the location change table 131 will be used, the control unit 160 may read the location change table 131, as shown in Table 1, from the memory unit 130. The control unit 160 may change a display location of an image by referring to the location change table 131. For example, when moving images are displayed at a lower region of the screen, an event (e.g., a tap gesture on an input window of a webpage) for requesting a display of a virtual keypad may occur. The control unit 160 may control the display unit 110 to display moving images at an upper region of the screen and display a virtual keypad at a lower region of the screen. Namely, moving images are moved from a lower region to an upper region of the screen. In an alternative case, a virtual keypad may be displayed at an upper region of the screen while moving images are still displayed at a lower region of the screen. Meanwhile, whether to use a location change function may be determined regardless of the location change table 131. Namely, the control unit 160 may change a display location of images without using the location change table 131. Related descriptions will be given below with reference to the drawings.

According to the trend of digital convergence, the mobile device 100 may further include other element, such as a camera, a Global Positioning System (GPS) module, a vibration motor, an acceleration sensor, an accessory, an external device interface (e.g., an ear jack), and the like. An accessory is an item detachable from the mobile device 100 and may be, for example, a pen used to touch the screen of the display unit 110. As will be understood by those skilled in the art, some of the above-mentioned elements in the mobile device 100 may be omitted or replaced with another element.

FIG. 2 is a flowchart illustrating an image display method according to an embodiment of the present disclosure. FIGS. 3A, 3B, 3C, 3D, 4A, and 4B are screenshots illustrating an image display method according to an embodiment of the present disclosure.

Referring to FIG. 2, at operation 210, the control unit 160 may determine whether the first event for requesting a display of moving images occurs. The first event may be a gesture (e.g., a tap on a thumbnail representing specific moving images) entered on the display unit 110 or a key input entered in the key input unit 120. Additionally, the first event may be voice command data. For example, when a title of specific moving images (e.g., Titanic) is displayed, a user may verbally indicate the title of moving images. The microphone MIC may receive the user's voice, convert it into audio signals, and deliver them to the audio processing unit 150. The control unit 160 may receive voice command data from the audio processing unit 150 and convert the received voice command data into text. If such text contains the title of specific moving images, the control unit 160 may determine that the first event occurs. Meanwhile, a user may submit a voice command (e.g., "Play Titanic."). The control unit 160 may interpret a user's intention through an artificial intelligence program and determine that the first event occurs. In this case, moving images and an artificial intelligence program may reside in an external server which can be connected to the mobile device 100. The control unit 160 may control the wireless communication unit 140 to transmit a moving image request message containing voice command data to the server. The server may interpret a user's intention by analyzing the received voice command data and transmit requested moving images to the mobile device 100. Upon receipt of the moving images, the control unit 160 may determine that the first event occurs.

In a case where the first event occurs, the control unit 160 may determine, at operation 215, the first region at which moving images will be displayed. For example, the control unit 160 may read display region information from the memory unit 130 and thereby determine the first region for displaying moving images.

Figure 3C:
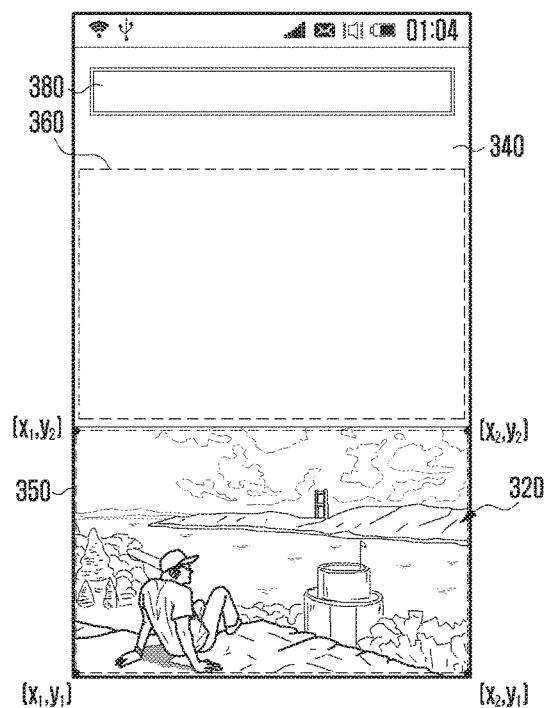

Referring to FIGS. 3A, 3B, 3C, 3D, 4A, and 4B, the size of the screen is 640*380, and display region information indicates (0, 0), (0, 213), (380, 0) and (380, 213). The first region is determined as indicated by a reference number 310. At operation 220, the control unit 160 may control the display unit 110 to display moving images 320 at the first region as shown in FIG. 3B. In addition, the control unit 160 may perform a popup function. Meanwhile, the display region information may indicate coordinates of a single point, e.g., (107, 190). In this case, the first region may be determined as a specific region having the center (107, 190).

At operation 225, the control unit 160 may determine whether the second event occurs. If the second event does not occur, the process may move to operation 230. At operation 230, the control unit 160 may determine whether to terminate a display of moving images. For example, if an exit button displayed on the display unit 110 is selected, the process may be terminated. Otherwise, the process may return to operation 225.

When the second event occurs, the control unit 160 may determine, at operation 235, the second region for displaying a specific image associated with the second event. For example, the control unit 160 may read display region information corresponding to the second event from the memory unit 130 and thereby determine the second region. In one embodiment of the present disclosure, a lower region of the screen may be determined as the second region for displaying a virtual keypad. In another embodiment of the present disclosure, an upper region of the screen may be determined as the second region for displaying information (e.g., a caller's name and/or a phone number) about a caller of an incoming call. In yet another embodiment of the present disclosure, a lower region of the screen may be determined as the second region for displaying a certain image (e.g., a call acceptance icon and a call rejection icon) that allows a user to accept or reject an incoming call. In still another embodiment of the present disclosure, an upper or middle region of the screen may be determined as the second region for displaying a notification image that indicates a reception of a message, such as a Short Message Service (SMS) message, a Multimedia Message Service (MMS) message, a Social Network Service (SNS) message, an email, a new message, and the like.

At operation 240, the control unit 160 may determine whether the second event is a specific event which may include an event for requesting a display of a virtual keypad received from the touch panel 111 or the key input unit 120, voice command data (e.g., a keypad) received from the microphone MIC through the audio processing unit 150, various types of messages (e.g., a call connection request message, an SMS message, an MMS message, an SNS message, an email, a new message, and the like) received from a certain network (e.g., a base station) through the wireless communication unit 140, and the like. If the specific event is a call connection request message (i.e., a video call connection request message), the playback of moving images may be paused. Namely, when a call connection request message is received from a network through the wireless communication unit 140, the control unit 160 may control the display unit 110 to continuously display a single frame. Herein, a frame refers to a still image which is a part of moving images. For example, moving images of one second may be composed of thirty frames. Thereafter, when a call is disconnected, a pause of moving images is released and the playback of moving images is resumed. Alternatively, when a video call connection request message is received, the playback of moving images may be unpaused. For example, the control unit 160 may control the display unit 110 to separately display moving images and a video call image at respective display regions. Herein, both regions may be not overlapped with each other under the control of the control unit 160. A video call image may contain incoming moving images received from the opposite device and outgoing moving images captured by a camera to be sent to the opposite device.

If the second event is not a specific event, the process may move to operation 245. At operation 245, the control unit 160 may perform a particular function corresponding to the second event. For example, if the second event is a tap on an Internet icon 330 as shown in FIG. 3B, the control unit 160 may control the display unit 110 to display a webpage 340 as shown in FIG. 3C at the second region (e.g., the entire screen). At this time, as shown in FIG. 3C, moving images 320 are displayed at the highest layer of the screen, so that a part of a webpage 340 cannot be seen. After a particular function corresponding to the second event is performed, the process may return to operation 225.

If the second event is a specific event, the control unit 160 may determine, at operation 250, whether the second region is overlapped with the first region. Herein, the overlap may include a case where all or a part of the second region is covered with all or a part of the first region.

If both regions are not overlapped with each other, the process may move to operation 255. At operation 255, the control unit 160 may control the display unit 110 to display a specific image associated with the second event at the second region. Therefore, both moving images and a specific image associated with the second event can be simultaneously displayed on the screen without any overlap.

If both regions are overlapped with each other, the control unit 160 may determine, at operation 260, the third region which is not overlapped with the second region. In one embodiment of the present disclosure, as shown in FIG. 3C, the control unit 160 may identify coordinates of four vertex points (x1, y1), (x1, y2), (x2, y1) and (x2, y2) of the second region 350 and determine the third region 360 having other four vertex points such that the third region 360 is not overlapped with the second region 350.

In another embodiment of the present disclosure, the control unit 160 may read the location change table 131 from the memory unit 130. For example, if a specific event is a virtual keypad display request event (e.g., a tap on an input window 380), the control unit 160 may confirm that location information linked to this event is an upper region of a screen. Therefore, the control unit 160 may determine the third region based on the confirmed location information.

Figure 3D:
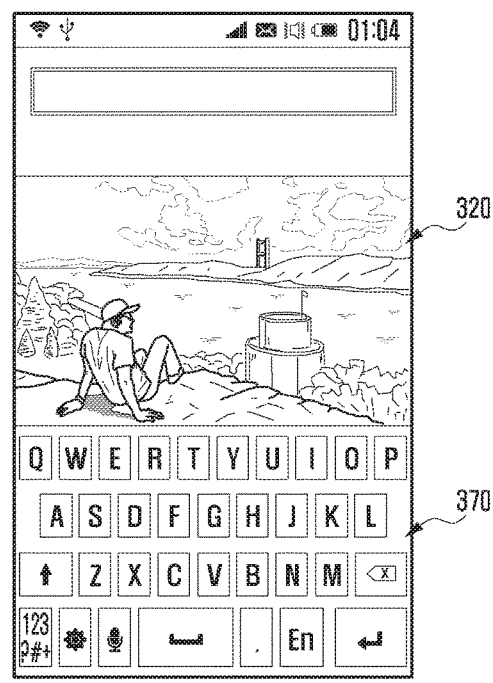
Figure 4A:
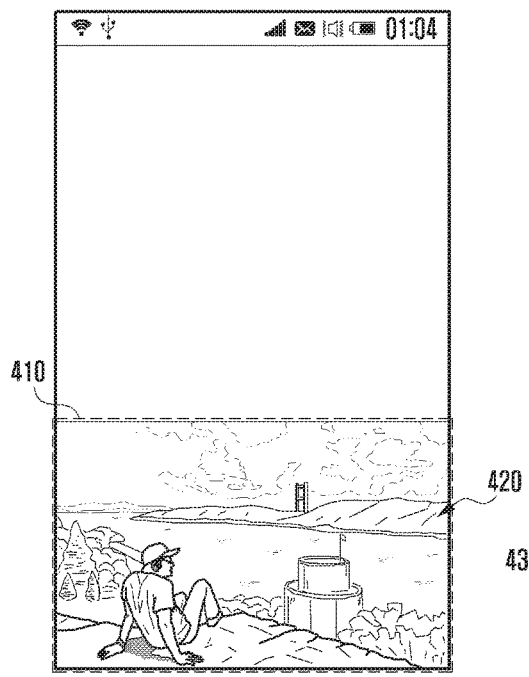
Figure 4B:
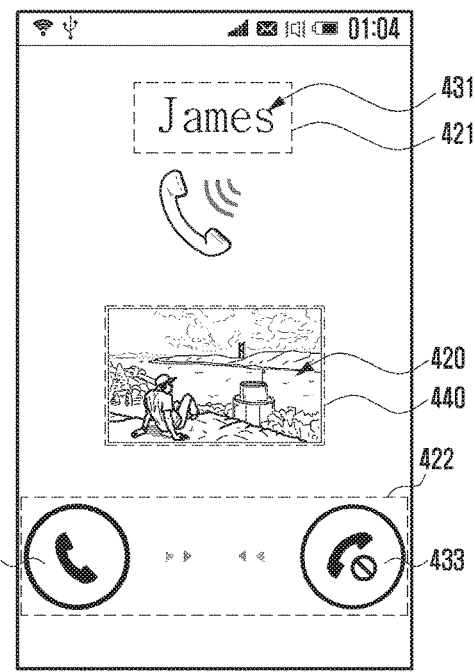

At operation 265, the control unit 160 may control the display unit 110 to display a specific image 370 associated with the second event at the second region and display moving images 320 at the third region as shown in FIG. 3D. Therefore, both moving images and a specific image associated with the second event can be simultaneously displayed on the screen without any overlap. Meanwhile, the second region may have two or more divided sub regions. For example, as shown in FIG. 4A, a call connection request message may be received while moving images 420 are displayed at the first region 410 determined as a lower region of a screen. Thereafter, as shown in FIG. 4B, the first sub region 421 of the second region for displaying caller information 431 may be determined as an upper region of a screen, and the second sub region 422 of the second region for displaying both a call acceptance icon 432 and a call rejection icon 433 may be determined as a lower region of a screen. In this case, the second sub region 422 of the second region may be overlapped with the first region 410. Therefore, the third region 440 may be determined as a middle region of a screen, and the moving images 420 may be reduced and displayed at the third region 440.

Figure 5:
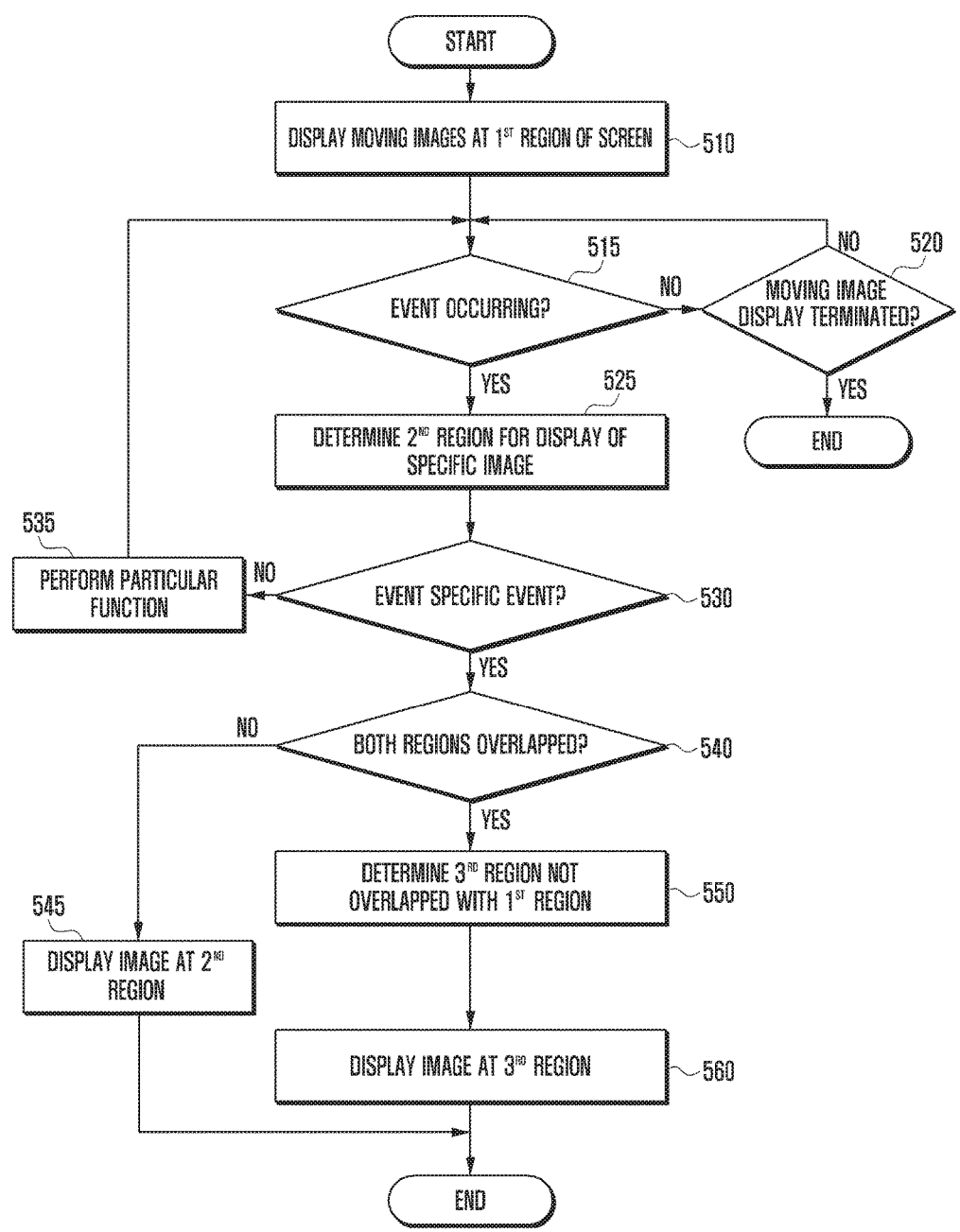
FIG. 5 is a flowchart illustrating an image display method according to an embodiment of the present disclosure.
Figure 6:
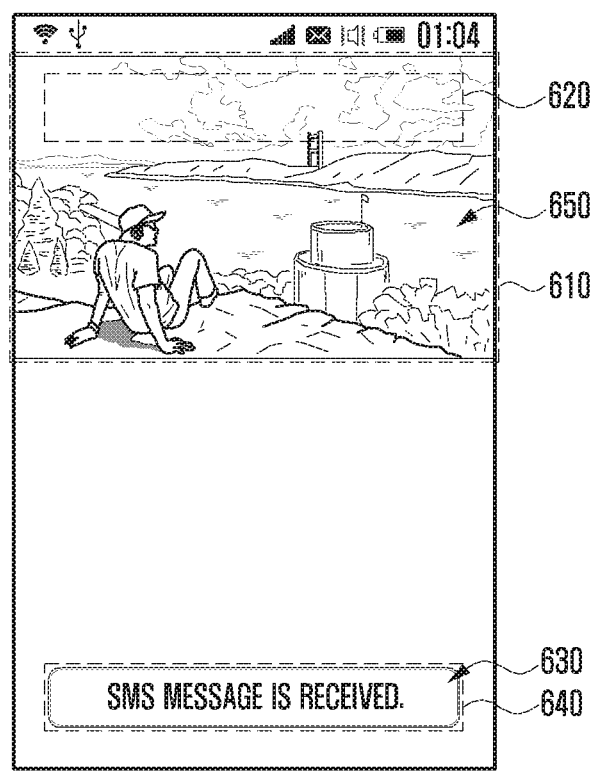
FIG. 6 is a screenshot illustrating an image display method according to an embodiment of the present disclosure.

FIG. 5 is a flowchart illustrating an image display method according to an embodiment of the present disclosure. FIG. 6 is a screenshot illustrating an image display method according to an embodiment of the present disclosure.

Referring to FIGS. 5 and 6, at operation 510, the control unit 160 may control the display unit 110 to display moving images 650 at a first region 610 of a screen. In addition, the control unit 160 may perform a popup function.

At operation 515, the control unit 160 may determine whether an event occurs. If no event occurs, the process may move to operation 520. At operation 520, the control unit 160 may determine whether to terminate a display of the moving images 650. If a display of the moving images is not terminated, the process may return to operation 515.

When an event occurs, the control unit 160 may determine at operation 525 the second region for displaying a specific image associated with the event.

At operation 530, the control unit 160 may determine whether the event is a specific event.

If the event is not a specific event, the process may move to operation 535. At operation 535, the control unit 160 may perform a particular function corresponding to the event after which the process may return to operation 515.

If the event is a specific event, the control unit 160 may determine at operation 540 whether the second region is overlapped with the first region.

If both regions are not overlapped with each other, the process may move to operation 545. At operation 545, the control unit 160 may control the display unit 110 to display a specific image associated with the event at the second region.

If both regions are overlapped with each other (for example, in a case where a second region 620 is overlapped with the first region 610 as shown in FIG. 6), the control unit 160 may determine at operation 550 the third region which is not overlapped with the first region. For example, the control unit 160 may read the location change table 131 from the memory unit 130 and confirm, from the location change table 131, location information linked to the specific event (e.g., a message reception). The control unit 160 may determine the third region based on the confirmed location information.

At operation 560, the control unit 160 may control the display unit 110 to display a specific image 630 associated with the specific event at a third region 640. Therefore, both the moving images 650 and the specific image 630 can be simultaneously displayed on the screen without any overlap.

Figure 7:
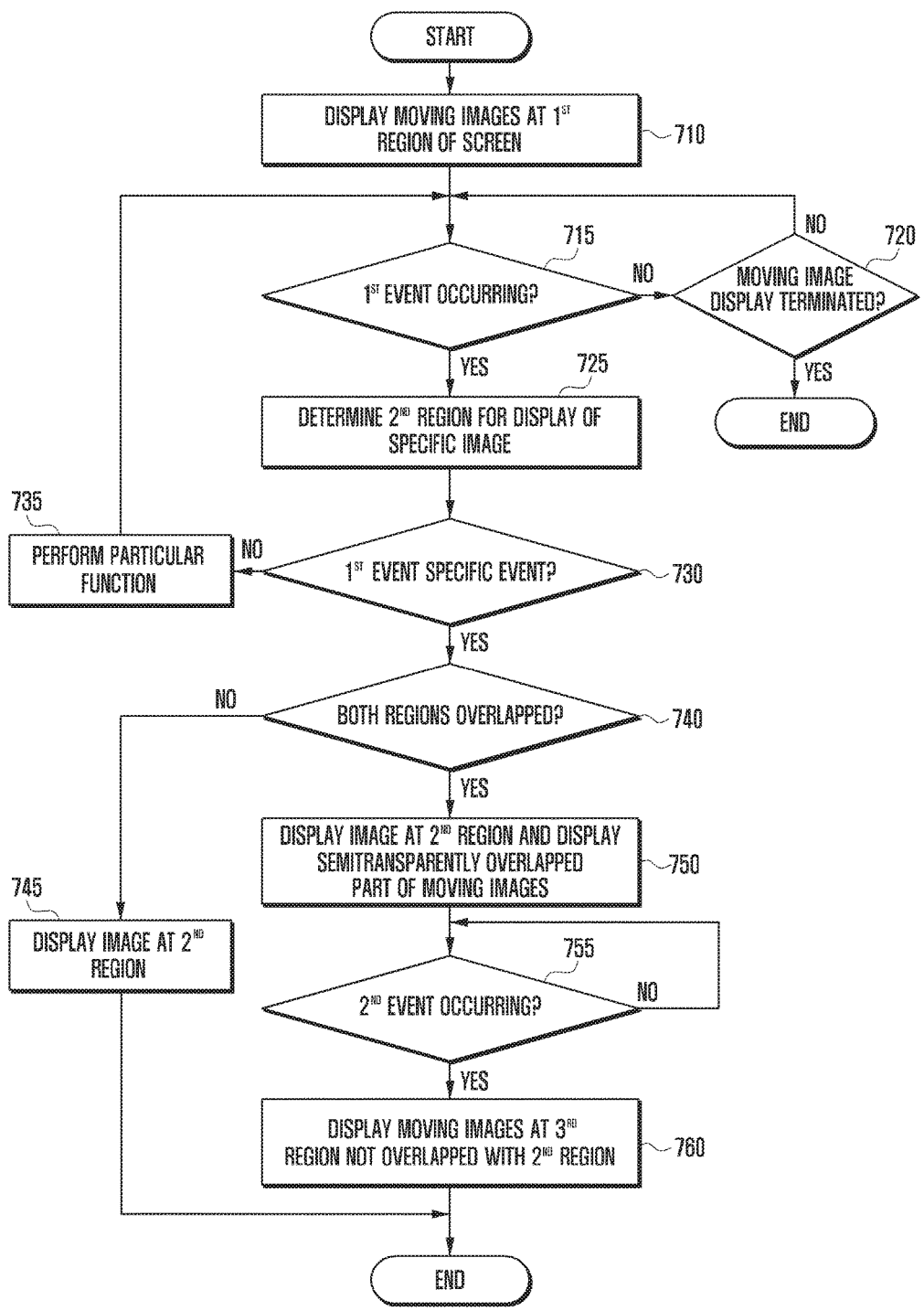
FIG. 7 is a flowchart illustrating an image display method according to an embodiment of the present disclosure.
Figure 8A:
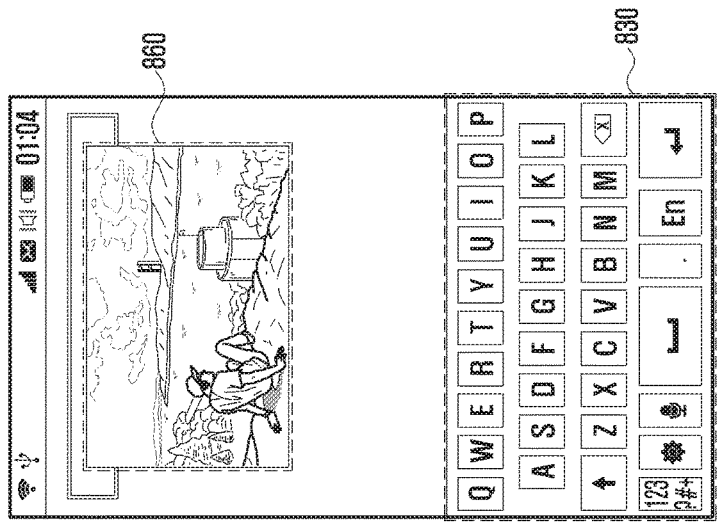
FIGS. 8A, 8B, and 8C are screenshots illustrating an image display method according to an embodiment of the present disclosure.
Figure 8B:
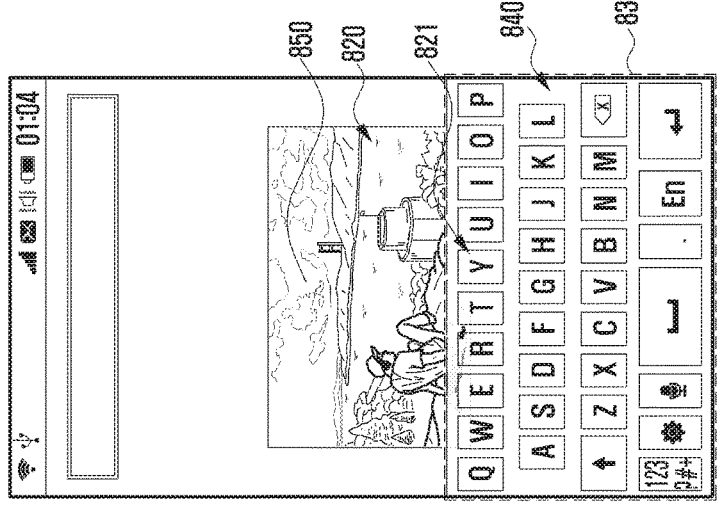
Figure 8C:
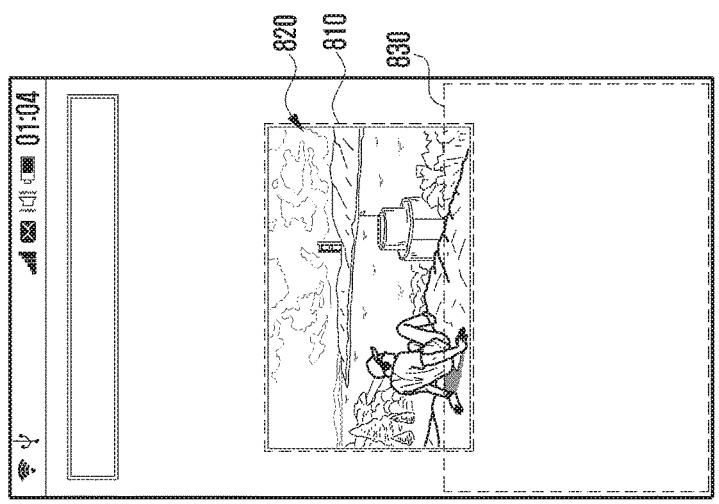

FIG. 7 is a flowchart illustrating an image display method according to an embodiment of the present disclosure. FIGS. 8A, 8B, and 8C are screenshots illustrating an image display method according to an embodiment of the present disclosure.

Referring to FIGS. 7, 8A, 8B, and 8C, at operation 710, the control unit 160 may control the display unit 110 to display moving images 820 at a first region 810 of a screen. In addition, the control unit 160 may perform a popup function.

At operation 715, the control unit 160 may determine whether the first event occurs. If the first event does not occur, the process may move to operation 720. At operation 720, the control unit 160 may determine whether to terminate a display of the moving images 820. If a display of the moving images is not terminated, the process may return to operation 715.

When the first event occurs, the control unit 160 may determine, at operation 725, the second region for displaying a specific image associated with the first event.

At operation 730, the control unit 160 may determine whether the first event is a specific event.

If the first event is not a specific event, the process may move to operation 735. At operation 735, the control unit 160 may perform a particular function corresponding to the first event after which the process may return to operation 715.

If the first event is a specific event, the control unit 160 may determine, at operation 740, whether the second region is overlapped with the first region.

If both regions are not overlapped with each other, the process may move to operation 745. At operation 745, the control unit 160 may control the display unit 110 to display a specific image associated with the first event at the second region.

If both regions are overlapped with each other (for example, in a case where a part of a second region 830 is overlapped with the first region 810 as shown in FIG. 8A), the control unit 160 may control, at operation 750, the display unit 110 to display a specific image 840 associated with the first event at the second region 830 as shown in FIG. 8B. At this time, the control unit 160 may control the display unit 110 to display semi-transparently a part 821 of the moving images 820 overlapped with the image 840. Therefore, the entire image 840 as well as the entire moving images 820 can be seen. Thereafter, if a touch event occurs on the overlapped part 821, the control unit 160 may regard this event as an event associated with the image 840 rather than the moving images 820. Meanwhile, the overlapped part 821 may not be displayed. Namely, even though a popup function is running, the image 840 may be exceptionally located at the highest layer and the moving image 820 may lie at the next layer.

At operation 755, the control unit 160 may determine whether the second event for requesting a change in a display location of the moving images 820 occurs. The second event may be a gesture (e.g., an upward flick 850 on the moving images 820) entered on the display unit 110 or a key input entered in the key input unit 120. Additionally, the second event may be voice command data (e.g., "Change the location of moving images."). As the moving images 820 are moved upward, the overlapped part 821 of the image 820 may not be overlapped with the image 840 and, thus become opaque under the control of the control unit 160.

At operation 760, as shown in FIG. 8C, the control unit 160 may control the display unit 110 to display the moving images 820 at a third region 860 in response to the second event. The third region 860 is not overlapped with the second region 830.

Figure 9:
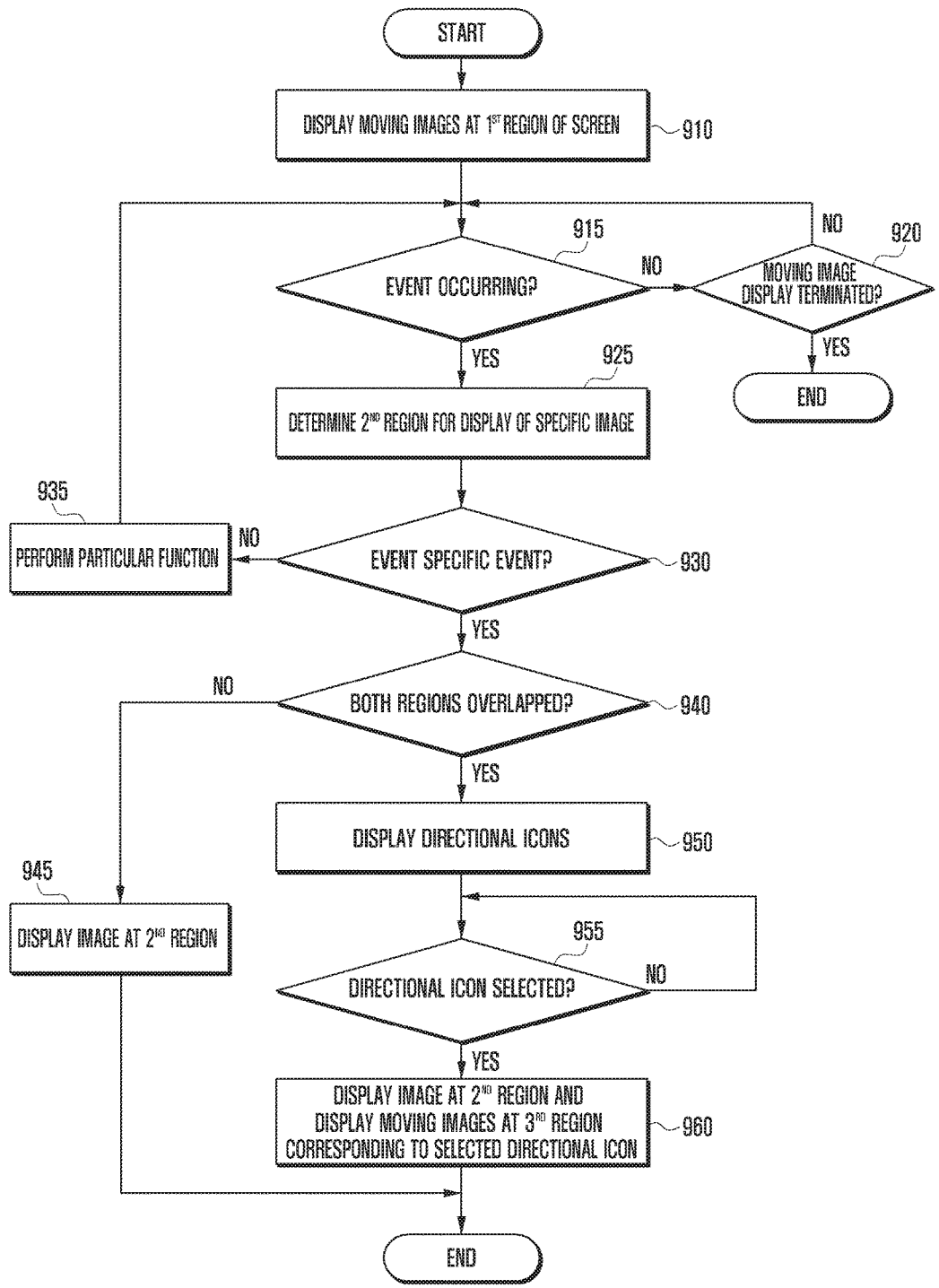
FIG. 9 is a flowchart illustrating an image display method according to an embodiment of the present disclosure.
Figure 10C:
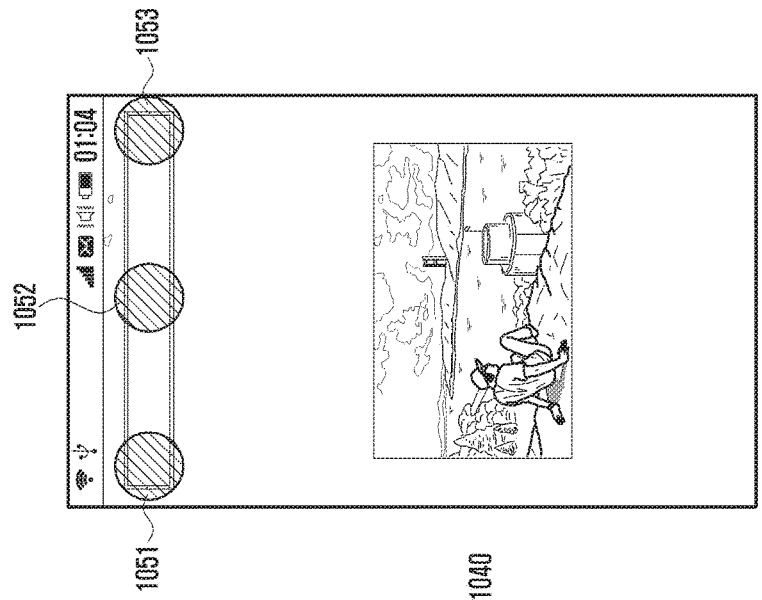
FIGS. 10A, 10B, and 10C are screenshots illustrating an image display method according to an embodiment of the present disclosure.
Figure 10B:
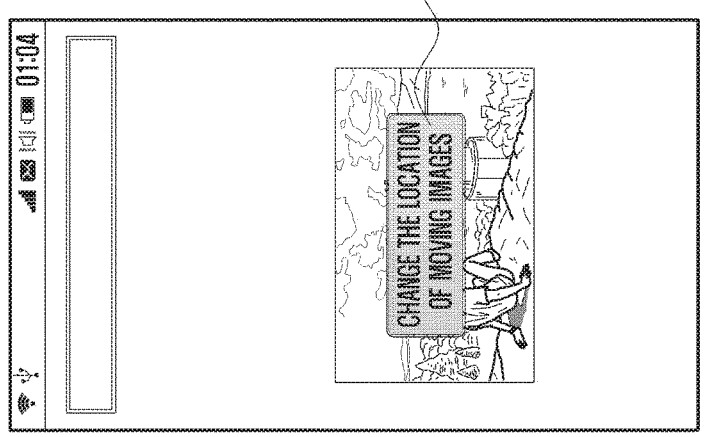
Figure 10A:
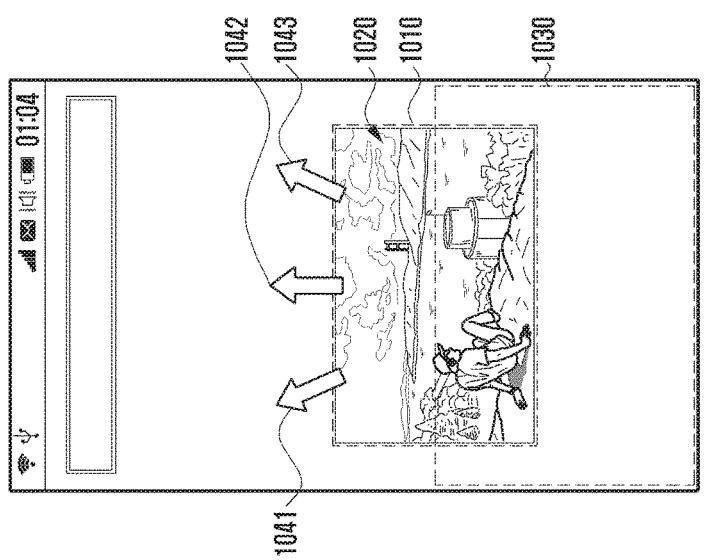

FIG. 9 is a flowchart illustrating an image display method according to an embodiment of the present disclosure. FIGS. 10A, 10B, and 10C are screenshots illustrating an image display method according to an embodiment of the present disclosure.

Referring to FIGS. 9, 10A, 10B, and 10C, at operation 910, the control unit 160 may control the display unit 110 to display moving images 1020 at a first region 1010 of a screen. In addition, the control unit 160 may perform a popup function.

At operation 915, the control unit 160 may determine whether an event occurs. If no event occurs, the process may move to operation 920. At operation 920, the control unit 160 may determine whether to terminate a display of the moving images 1020. If a display of the moving images is not terminated, the process may return to operation 915.

When an event occurs, the control unit 160 may determine at operation 925 the second region for displaying a specific image associated with the event.

At operation 930, the control unit 160 may determine whether the event is a specific event.

If the event is not a specific event, the process may move to operation 935. At operation 935, the control unit 160 may perform a particular function corresponding to the event after which the process may return to operation 915.

If the event is a specific event, the control unit 160 may determine, at operation 940, whether the second region is overlapped with the first region 1010.

If both regions are not overlapped with each other, the process may move to operation 945. At operation 945, the control unit 160 may control the display unit 110 to display a specific image associated with the event at the second region.

If both regions are overlapped with each other (for example, in a case where a part of a second region 1030 is overlapped with the first region 1010 as shown in FIG. 10A), the control unit 160 may control, at operation 950, the display unit 110 to display some directional icons 1041, 1042 and 1043 which act as guiding symbols for changes in a location of the moving images 1020. As shown in FIG. 10B, a guide message 1040 may be displayed instead of the directional icons 1041 to 1043. This message 1040 may disappear shortly after a given time (e.g., after two seconds). As soon as the guide message 1040 disappears, the control unit 160 may control the display unit 110 to display some location designating icons 1051, 1052 and 1053 as shown in FIG. 10C. These icons 1051 to 1053 may also act as guiding symbols for changes in a location of the moving images.

At operation 955, the control unit 160 may determine whether a directional icon (or location designating icon) is selected.

If one of the directional icons (or one of the location designating icons) is selected, the control unit 160 may control, at operation 960, the display unit 110 to display a specific image associated with the event at the second region 1030 and display the moving images 1020 at the third region corresponding to the selected directional icon (or the selected location designating icon).

Figure 11:
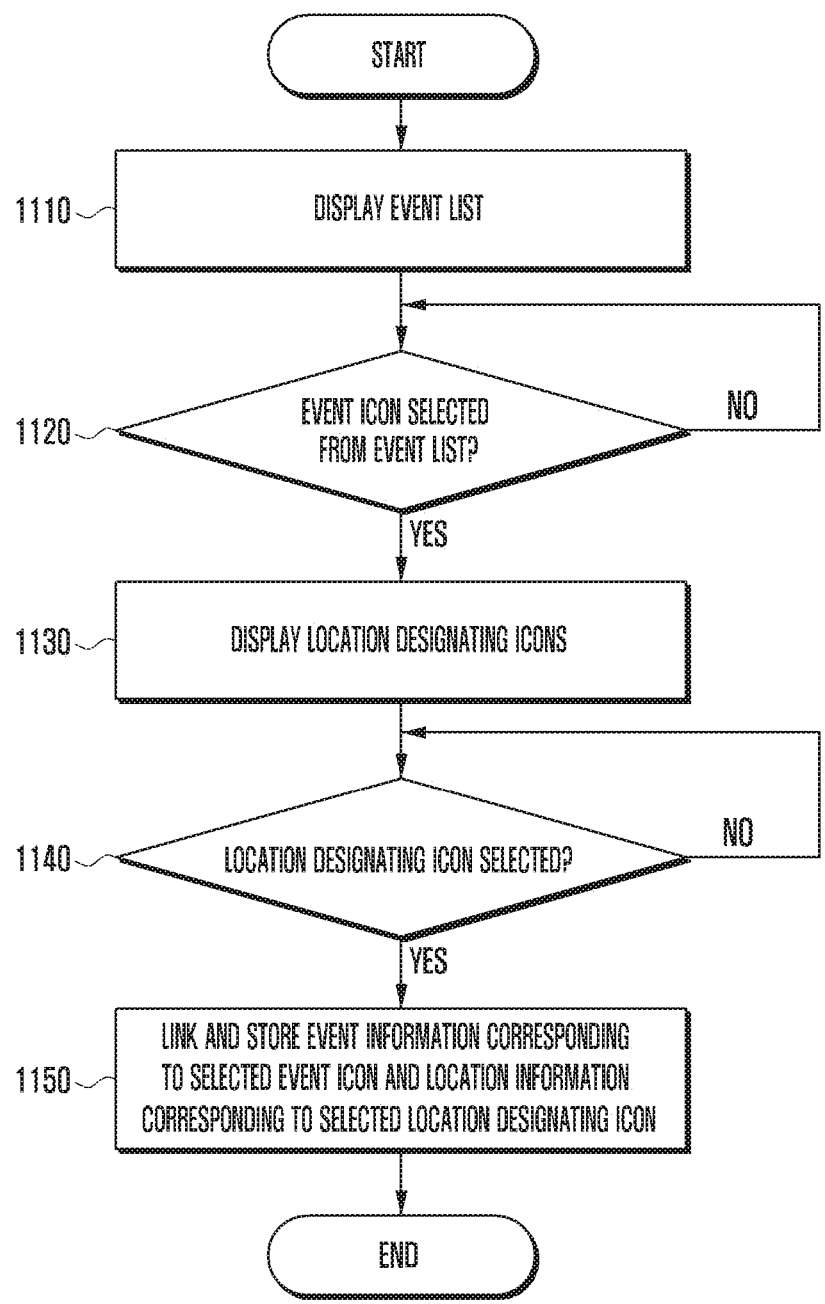
FIG. 11 is a flowchart illustrating an image display method according to an embodiment of the present disclosure.

FIG. 11 is a flowchart illustrating an image display method according to an embodiment of the present disclosure. FIGS. 12A, 12B, and 12C are screenshots illustrating an image display method according to an embodiment of the present disclosure.

Referring to FIGS. 11, 12A, 12B, and 12C, at operation 1110, the control unit 160 may control the display unit 110 to display an event list 1210. For example, the display unit 110 may display a home image containing a setting icon and, in response to a selection of the setting icon, display a setting image containing a location change menu. When the location change menu is selected, the event list 1210 may be displayed as shown in FIG. 12A.

At operation 1120, the control unit 160 may determine whether one of event icons is selected from the event list 1210.

If an event icon is selected, the control unit 160 may control, at operation 1130, the display unit 110 to display several location designating icons 1221 to 1229 as shown in FIG. 12B. These icons 1221 to 1229 may be used for setting location information corresponding to the selected event. Alternatively, as shown in FIG. 10C, some directional icons 1231 to 1238 may be used instead of the location designating icons.

At operation 1140, the control unit 160 may determine whether a location designating icon (or a directional icon) is selected.

If one of the location designating icons (or one of the directional icons) is selected, the control unit 160 may perform, at operation 1150, a mapping process for linking together event information corresponding to the selected event icon and location information corresponding to the selected location designating icon (or the selected directional icon). Mapping relations may be stored in the memory unit 130, i.e., in the location change table 131.

Meanwhile, the above-discussed embodiments may be focused on a portrait mode, i.e., a lengthwise mode, which is one of two display modes and does not limit the present disclosure. Additionally, the above-discussed embodiments may also be applied to a landscape mode, i.e., a widthwise mode. The mobile device 100 may further include an acceleration sensor or another equivalent for detecting the attitude of the mobile device. This sensor may detect the acceleration of the mobile device 100 (e.g., X-axis acceleration, Y-axis acceleration and Z-axis acceleration) and its variation, create detection information, and deliver it to the control unit 160. The control unit 160 may calculate the attitude of the mobile device 100, e.g., slope information which may contain a roll angle, a pitch angle and a yaw angle, by using the detection information received from such a sensor. Normally a roll angle denotes a rotational angle on the X-axis, a pitch angle denotes a rotational angle on the Y-axis, and a yaw angle denotes a rotational angle on the Z-axis. Using such slope information, the control unit 160 may determine a display mode of the mobile device 100. This display mode may be fixed regardless of the attitude of the mobile device 100. If a screen auto rotation function is set to be on-state, the control unit 160 may determine a display mode based on slope information.

Figure 13A:
FIGS. 13A and 13B are screenshots illustrating an image display method in a landscape mode according to an embodiment of the present disclosure.
Figure 13B:
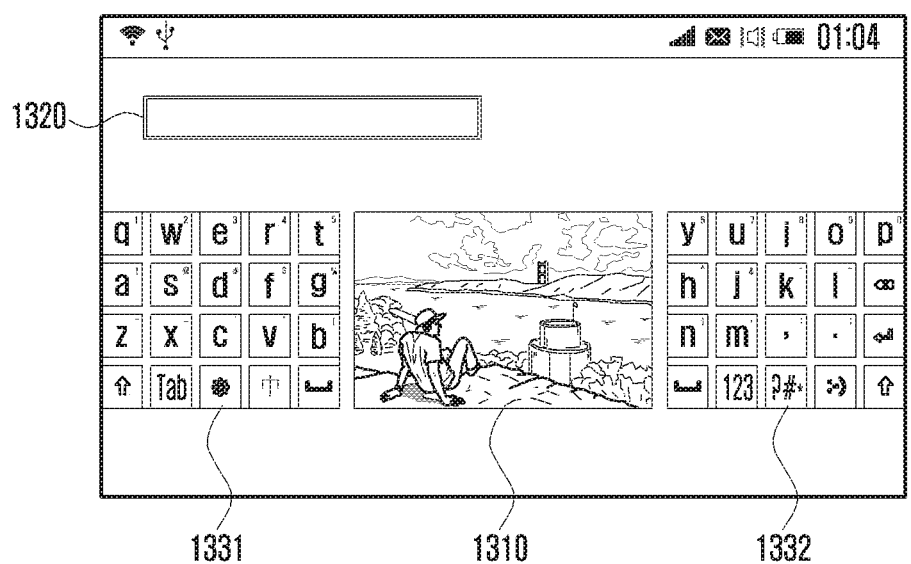

FIGS. 13A and 13B are screenshots illustrating an image display method in a landscape mode according to an embodiment of the present disclosure.

Referring to FIGS. 13A and 13B, the control unit 160 may perform a popup function. For example, under the control of the control unit 160, the display unit 110 may display moving images 1310 at a left region of a screen. If an event (e.g., a tap on an input window 1320) occurs, the display unit 110 may display the moving images 1310 at the center of the screen under the control of the control unit 160. In addition, the display unit 110 may further display a left keypad 1331 and a right keypad 1332 of a split keypad at a left region and a right region of the screen, respectively.

The above-discussed image display method is described herein with reference to flowchart illustrations of user interfaces, methods, and computer program products according to embodiments of the present disclosure. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Moreover, each block of the flowchart illustrations may represent a module, a segment, or a portion of code, which comprises one or more executable instructions for implementing the specified logical function(s). It should also be noted that in some alternative implementations, the functions noted in the blocks may occur out of the order. For example, two blocks shown in succession may in fact be executed concurrently or the blocks may sometimes be executed in the reverse order, depending upon the functionality involved.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile device comprising:
a touch screen; and
at least one processor configured to:
provide a first window on the touch screen,
provide a second window displaying a moving image over a portion of the first window,
detect a user input while the second window is provided over the portion of the first window, and
if it is determined that the second window overlaps with a keyboard when the keyboard is displayed on the touch screen in response to the detection of the user input, control to move the second window on the touch screen and display the keyboard over the first window while displaying the moving image in the moved second window,
wherein the first window includes a text input area displayed on the touch screen and an area not including the text input area displayed on the touch screen,
wherein the moved second window is located over the area not including the text input area, and
wherein the moved second window is free from overlapping the displayed keyboard and the text input area.

2. The mobile device of claim 1,
wherein the at least one processor is further configured to, if it is determined that the second window is provided at a first part of the touch screen, control to move the second window from the first part of the touch screen to a second part of the touch screen, and
wherein the second window moved to the second part of the touch screen is free from overlapping the displayed keyboard.

3. The mobile device of claim 2, wherein the moving image is displayed on a lower part of the touch screen as the first part before the moving.

4. The mobile device of claim 2, wherein the at least one processor is further configured to:
reduce the second window that displays the moving image, and
provide the reduced second window at a third part of the touch screen.

5. The mobile device of claim 2, further comprising a memory configured to store location change information that defines mapping relations between the first part of the touch screen and the second part of the touch screen.

6. The mobile device of claim 5, wherein the location change information is configured to be set by a user.

7. The mobile device of claim 1, wherein the first window is displayed in a full screen and the second window is provided over the first window.

8. The mobile device of claim 1, wherein the text input area is displayed on an upper part of the touch screen.

9. The mobile device of claim 1, wherein the moved second window is free from overlapping the displayed keyboard, the text input area, and a third window provided on the touch screen.

10. The mobile device of claim 9, wherein the third window comprises a message or a notification window.

11. The mobile device of claim 1,
wherein the first window comprises a web page, and
wherein the moving image is displayed over the web page.

12. The mobile device of claim 1, wherein a size and a location of the second window is configured to be adjusted manually.

13. The mobile device of claim 1,
wherein, when a call connection request message is received for initiating a call while the moving image is displayed, the at least one processor is further configured to pause a playback of the moving image, and
wherein, when the call is disconnected, the at least one processor is further configured to release the pausing of the playback of the moving image.

14. The mobile device of claim 1, wherein the at least one processor is further configured to split the displayed keyboard into a left side keyboard and a right side keyboard.

15. The mobile device of claim 14, wherein the at least one processor is further configured to provide the second window displaying the moving image directly between the left side keyboard and the right side keyboard.

16. The mobile device of claim 1, wherein a border of the moved second window substantially contacts a border of the keyboard if the second window is moved to display the keyboard at the first part of the touch screen.

17. A method of displaying windows on a mobile device, the method comprising:
providing a first window on a touch screen of the mobile device;
providing a second window that displays a moving image over a portion of the first window;
detecting a user input while the second window is provided over the portion of the first window; and
if it is determined that the second window overlaps with a keyboard when the keyboard is displayed on the touch screen in response to the detection of the user input, moving the second window on the touch screen and displaying the keyboard over the first window while displaying the moving image in the moved second window,
wherein the first window includes a text input area displayed on the touch screen and an area not including the text input area displayed on the touch screen,
wherein the moved second window is located over the area not including the text input area, and
wherein the moved second window is free from overlapping the displayed keyboard and the text input area.

18. The method of claim 17,
wherein, if it is determined that the second window is provided at a first part of the touch screen, the moving of the second window comprises moving the second window from the first part of the touch screen to a second part of the touch screen, and
wherein the second window moved to the second part of the touch screen is free from overlapping the displayed keyboard.

19. The method of claim 18, wherein the moving image is displayed on a lower part of the touch screen as the first part before the moving.

20. The method of claim 18, further comprising:
reducing the second window that displays the moving image; and
providing the reduced second window at a third part of the touch screen.

21. The method of claim 18, further comprising:
storing, in a memory, location change information that defines mapping relations between the first part of the touch screen and the second part of the touch screen,
wherein the location change information is configured to be set by a user.

22. The method of claim 17, wherein the first window is displayed in a full screen and the second window is provided over the first window.

23. The method of claim 17, wherein the text input area is displayed on an upper part of the touch screen.

24. The method of claim 23, wherein the moved second window is free from overlapping the displayed keyboard, the text input area, and a third window provided on the touch screen.

25. The method of claim 17,
wherein the first window comprises a web page, and
wherein the moving image is displayed over the web page.

26. The method of claim 17, further comprising:
pausing, when a call connection request message is received for initiating a call while the moving image is displayed, a playback of the moving image; and
releasing, when the call is disconnected, the pausing of the playback of the moving image.

27. The method of claim 17, further comprising splitting the displayed keyboard into a left side keyboard and a right side keyboard.

28. A mobile electronic apparatus comprising:
a touch screen; and
at least one processor configured to:
display a web browser on the touch screen, the web browser including a text input area and an area not including the text input area,
provide a pop-up window in which a moving image is displayed, the pop-up window being provided over a portion of the web browser,
detect a touch input at the text input area of the web browser while the web browser is displayed and the pop-up window is provided over the portion of the web browser, and
in response to the detection of the touch input at the text input area and if it is determined that the pop-up window is provided at a first screen location, control to move the pop-up window from the first screen location to a second screen location and display a virtual keyboard while displaying the moving image in the moved pop-up window over the portion of the web browser, at the second screen location free from overlapping the displayed virtual keyboard,
wherein the web browser is displayed in a full screen and the pop-up window is provided over the portion of the web browser, and
wherein the text input area is free from overlapping the moving image and the moved pop-up window is located over the non-text input area.

* * * * *